US007814205B2

(12) United States Patent
LoGalbo et al.

(10) Patent No.: US 7,814,205 B2
(45) Date of Patent: Oct. 12, 2010

(54) METHOD AND APPARATUS FOR MANAGING FLOOR CONTROL IN A NETWORK

(75) Inventors: Bob D. LoGalbo, Rolling Meadows, IL (US); Bradley M. Hiben, Glen Ellyn, IL (US); Matthew C. Keller, Algonquin, IL (US); Donald G. Newberg, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 749 days.

(21) Appl. No.: 11/300,779

(22) Filed: Dec. 15, 2005

(65) Prior Publication Data

US 2007/0143478 A1 Jun. 21, 2007

(51) Int. Cl.
*G06F 15/173* (2006.01)
(52) U.S. Cl. .................................................... 709/226
(58) Field of Classification Search .............. 707/104.1, 707/10, E17.005, 103 R, E17.01, E17.006, 707/E17.032; 187/247, 391; 700/83, 17; 709/223, 203, 218, 201, 224, 226; 455/518; 257/E21.525; 705/28, 8
See application file for complete search history.

(56) References Cited

U.S. PATENT DOCUMENTS

| | | | | |
|---|---|---|---|---|
| 4,745,599 | A * | 5/1988 | Raychaudhuri | 370/348 |
| 5,566,180 | A * | 10/1996 | Eidson et al. | 370/473 |
| 5,793,747 | A * | 8/1998 | Kline | 370/230 |
| 6,125,368 | A * | 9/2000 | Bridge et al. | |
| 6,272,132 | B1 * | 8/2001 | Ofek et al. | 370/389 |
| 6,385,434 | B1 * | 5/2002 | Chuprun et al. | 455/11.1 |
| 6,466,550 | B1 * | 10/2002 | Foster et al. | 370/261 |
| 6,665,701 | B1 * | 12/2003 | Combs et al. | 718/104 |
| 6,836,469 | B1 * | 12/2004 | Wu | 370/322 |
| 7,085,244 | B2 * | 8/2006 | Koskelainen et al. | 370/261 |
| 2003/0174665 | A1 * | 9/2003 | Benveniste | 370/317 |
| 2003/0235184 | A1 * | 12/2003 | Dorenbosch et al. | 370/352 |
| 2004/0062278 | A1 * | 4/2004 | Hadzic et al. | 370/503 |
| 2004/0186907 | A1 * | 9/2004 | Wentink | 709/225 |
| 2004/0218532 | A1 * | 11/2004 | Khirman | 370/235 |
| 2005/0270982 | A1 * | 12/2005 | McBeath | 370/252 |

OTHER PUBLICATIONS

Bertoglio et al. Abstract: "Intermedia Synchronization for Video Conference over IP". Signal Processing Image Communication. 1999.*
Schulzrinne, H. et al. (Jan. 1996). RTP: A Transport for Real Time Applications; RFC 1889.*
Lamport, L. (1978). "Time, Clocks, and the Ordering of Events in a Distributed System", Communications of the ACM, 21(7).*

* cited by examiner

*Primary Examiner*—Jeffrey Pwu
*Assistant Examiner*—Saad A Waqas
(74) *Attorney, Agent, or Firm*—Indira Salada; Anthony P. Curtis

(57) ABSTRACT

A method for managing floor control in a network is disclosed. The method includes beginning a ballot timer when at least one of a) a first node packet is created at the node and b) a second node packet is received at the node from a second node. The first node packet comprises a first timestamp and the second node packet comprises a second timestamp. The ballot timer runs for a first predefined time interval. The method further includes determining a floor holder upon expiration of the first predefined time interval based upon an earliest time of the first timestamp and the second timestamp. Further, the node and the second node have a same absolute timing reference.

23 Claims, 4 Drawing Sheets

US 7,814,205 B2

METHOD AND APPARATUS FOR MANAGING FLOOR CONTROL IN A NETWORK

FIELD OF THE INVENTION

This invention generally relates to the field of networks and more specifically to managing floor control in a network.

BACKGROUND OF THE INVENTION

With an increase in the need for communication and information exchange, networks such as computer networks, telecommunications networks, mobile networks and the like are increasingly becoming popular. One of the main advantages of networks is the facility it provides for sharing resources. A network may have a number of users or applications, simultaneously trying to access one or more shared resources. Examples of the shared resources include, but are not limited to storage devices, peripheral devices such as printers, or rights in the network, such as a right to talk in a group call, and the like.

To access a shared resource, an application or a user requires a floor. As used herein, the floor may be an access right or a manipulation function for the shared resources. An application or a user having the floor is able to gain an access to the shared resources in the network. For example, in a group call, there can be many users participating simultaneously and the floor may be the right to talk in the group call. At any instance of time, there can only be one user as a floor holder in the group call. At that instance, the floor holder has the right to talk in the group call while other members of the group listen.

There are various methods available for managing floor control in a network. One existing method uses one or more centralized servers for managing floor control. The centralized servers receive request from the network and determine a floor holder. For example, telecommunications networks use centralized servers for determining the floor holder in a group call. A user sends a request for the floor control to the centralized servers. The centralized servers determine the floor holder based on the requests. However, this method involves dependence on the centralized servers. The method may fail when one or more of the centralized severs are unavailable. Moreover, this method is costly, since it requires maintaining the centralized servers. A second existing method for managing floor control requires a plurality of nodes, such as wireless base stations, to negotiate and to agree on a common floor holder by sending signals to each other. However, this method introduces delays that are caused by sending and receiving signals to determine the floor holder. Accordingly, there is a need for a new method and apparatus for managing floor control in a network.

BRIEF DESCRIPTION OF THE FIGURES

The present invention is illustrated by way of example, and not limitation, in the accompanying figures, in which like references indicate similar elements, and in which.

Figure 1:
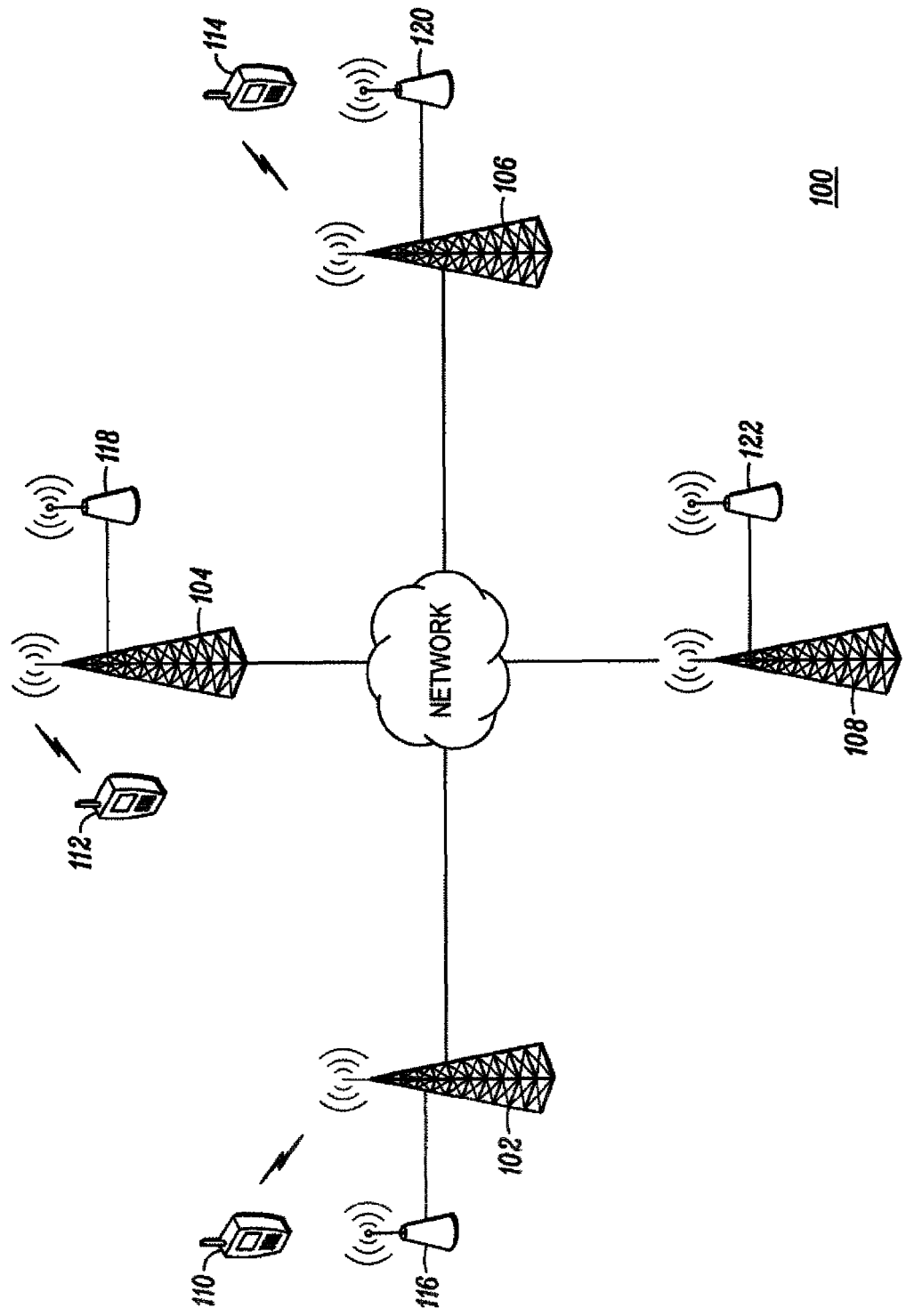
FIG. 1 illustrates an exemplary network in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Various embodiments of the present invention provide for managing floor control in a network. Before describing in detail the particular method and the system for managing floor control in the network in accordance with the present invention, it should be observed that the present invention resides primarily in combinations of method steps and apparatus elements related to managing floor control in the network. Accordingly, the method steps have been represented where appropriate by conventional symbols in the drawings, showing only those specific details that are pertinent to understanding the present invention so as not to obscure the disclosure with details that will be readily apparent to those of ordinary skill in the art having the benefit of the description herein.

In this document, relational terms such as first and second and the like may be used solely to distinguish one entity or action from another entity or action without necessarily requiring or implying any actual such relationship or order between such entities or actions. The terms 'comprises,' 'comprising,' or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by 'comprises . . . a' does not, without more constraints, preclude the existence of additional identical elements in the process, method, article, or apparatus that comprises the element.

A term 'another', as used herein, is defined as at least a second or more. The terms 'including' and/or 'having', as used herein, are defined as comprising.

FIG. 1 illustrates an exemplary network 100, in accordance with an embodiment of the present invention. The network 100 may be geographically spread over an area such as a building, a campus, a city, and so forth. Examples of the network 100 include a Local Area Network (LAN), a Metropolitan Area Network (MAN), a Wide Area Network (WAN) such as the Internet, and the like. In an embodiment of the present invention, the network 100 is a peer to peer network.

The network 100 further includes a number of nodes. For the purpose of this description, the network 100 is shown to include a node 102, a node 104, a node 106, and a node 108. Examples of the nodes include, but are not limited to, wireless base stations, radio frequency (RF) base stations, and the like. The nodes are interconnected through wired means or wireless means. In an embodiment of the present invention, the nodes are interconnected through the Internet.

The network 100 further includes a number of subscriber devices. For the purpose of this description, the network 100 is shown to include a subscriber device 110, a subscriber device 112, and a subscriber device 114. Examples of the subscriber devices include, but are not limited to, computers, laptops, radios, Personal Digital Assistants (PDAs), mobiles, and the like. As shown in FIG. 1, each subscriber device is associated with at least one node. For example, the subscriber device 110 is associated with the node 102. Further, each subscriber device is capable of sending subscriber packets to the associated node through wired or wireless means. For example, the subscriber device 110 is capable of sending subscriber packets to the node 102. In an embodiment of the present invention, subscriber packets include a digital sample and a source address of the subscriber device. In an embodiment of the present invention, each subscriber device is capable of sending subscriber packets to the associated node by an Over the Air (OTA) transmission.

In addition, the network 100 includes a number of time sources. For the purpose of this description, the network 100 is shown to include a time source 116, a time source 118, a time source 120, and a time source 122. Each of the time sources is associated with at least one node. For example, the time source 116 is associated with the node 102, the time source 118 is associated with the node 104, the time source 120 is associated with the node 106, and the time source 122 is associated with the node 108. In one embodiment, each of the time sources has the same absolute timing reference, e.g. such as a Global Positioning System (GPS). The time source enables the nodes to timestamp the subscriber packets and the timestamps are used to determining a floor holder. In an embodiment of the present invention, when multiple nodes in the network 100 make a request for time stamps from their associated time sources, then the order of the time stamps received by the nodes is the same as the order of the requests received by the time sources. For example, the node 102 makes a request for a time stamp to the time source 116. After some time, the node 104 makes a similar request to the time source 118. Then the time stamp received by the node 102 will be older than the time stamp received by the node 104.

Figure 2:
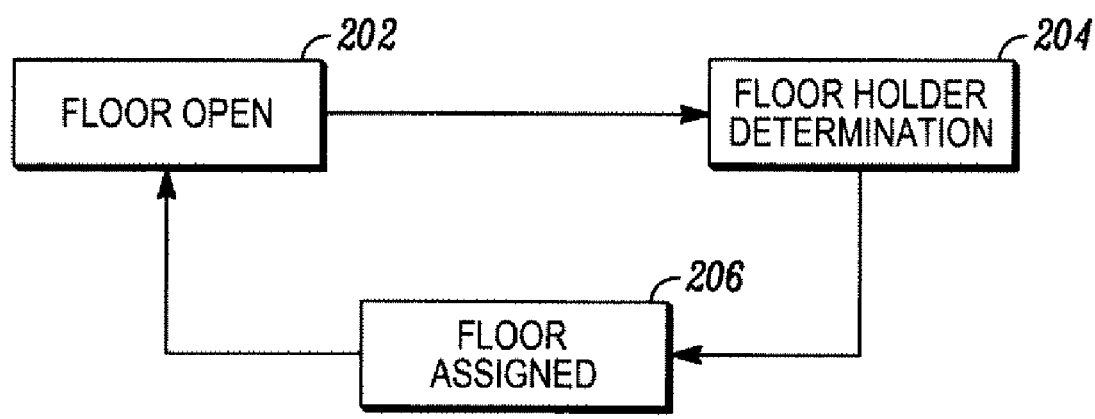
FIG. 2 is a state diagram illustrating states of a node involved in managing floor control in accordance with an embodiment of the present invention.

FIG. 2 is a state diagram illustrating states of a node (e.g. node 102 of FIG. 1) involved in managing of floor control in accordance with an embodiment of the present invention. State 202 represents a node in a 'Floor open' state. In the 'Floor open' state, no subscriber device in the network 100 is assigned the floor. The node receives a subscriber packet from an associated subscriber device. A first node packet is created from the received subscriber packet. The node may also receive a subsequent node packet from another node. As used herein, the subsequent node packet may arrive at the node before the first node packet. Thus, the qualifiers "first" and "subsequent" do not imply ordering. The subsequent node packet includes a subsequent subscriber packet and a subsequent timestamp that relates to the time that the subsequent subscriber packet is received by the other node. A ballot timer begins on creation of the first node packet or on receiving the subsequent node packet. In an embodiment of the present invention, the subscriber packet includes a digital sample and a source address of the associated subscriber device. The digital sample may include a digital voice sample, a digital video sample, and the like. The node then generates a ballot list based on source addresses and timestamp of the subscriber packet and the second node packet. In an embodiment of the present invention, the ballot list includes a source address and the timestamp of at least one of the subscriber packet received from the associated subscriber device and the subsequent node packet received from other nodes subsequent to the commencement of the ballot timer.

Continuing with FIG. 2, state 204 represents that the node is in a 'Floor Holder Determination' state. In state 204, the node further receives one or more subscriber packets from associated subscriber devices or node packets from other nodes in the network. The node then makes entries in the ballot list corresponding to the source addresses and the timestamp of the received packets. On expiration of the first predefined time interval, measured by the ballot timer, the node determines the floor holder by selecting a subscriber device corresponding to the oldest timestamp from the ballot list.

Continuing with FIG. 2, state 206 represents the node in a 'Floor Assigned' state. In state 206, the determined floor holder is assigned the floor. Once the floor is assigned, the data packets from the floor holder are sent to the other nodes in the network. In an embodiment of the present invention, when the associated subscriber device is determined as the floor holder, the node receives subscriber packets from the floor holder. The node then creates node packets from the received subscriber packets. The created node packets are then sent to other nodes in the network by the node. In another embodiment of the present invention, the node discontinues sending subscriber packets that are not sent by the floor holder.

Figure 3:
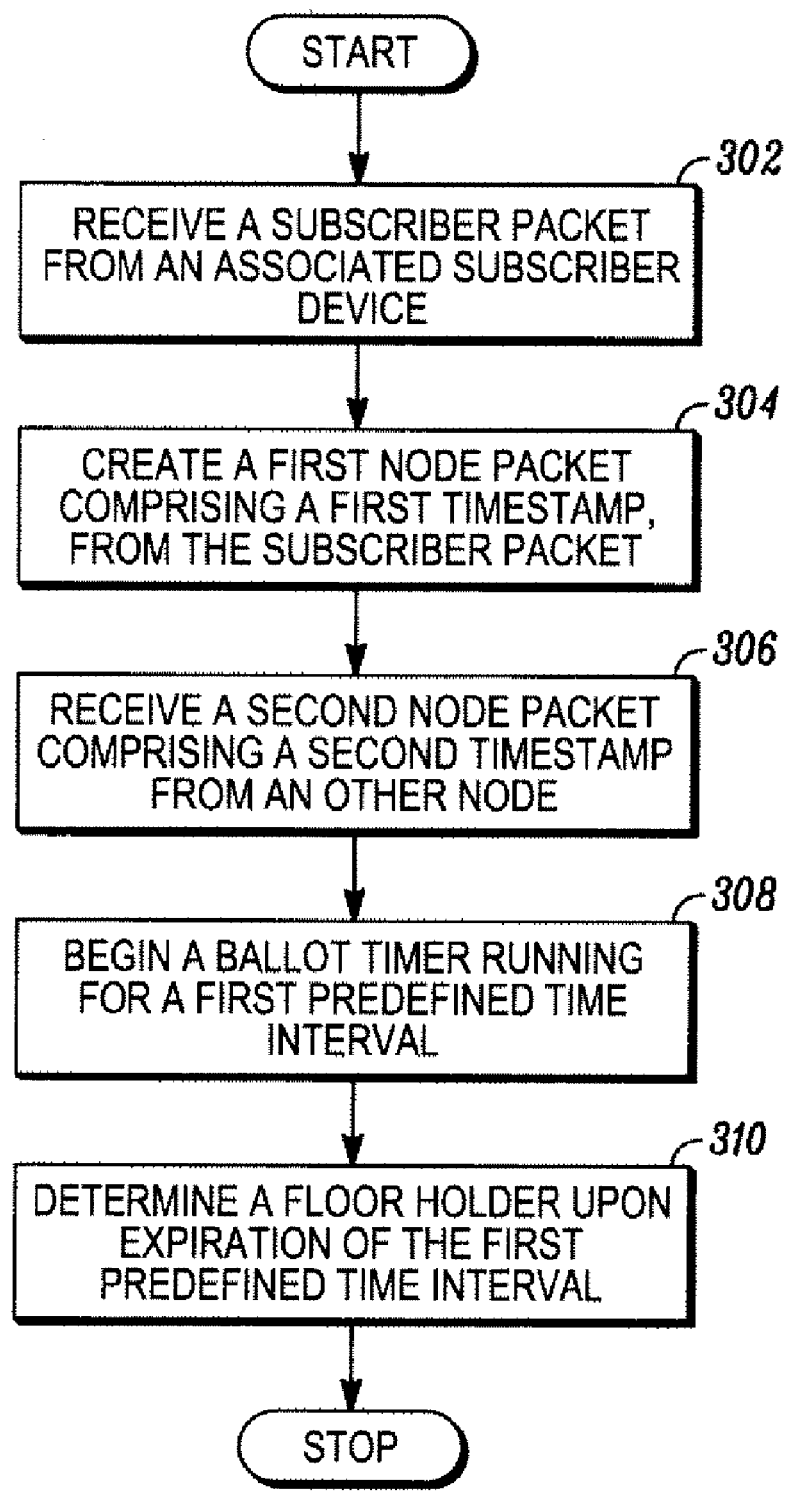
FIG. 3 is a flowchart illustrating the steps involved in managing floor control in accordance with another embodiment of the present invention.

FIG. 3 is a flowchart illustrating the steps involved in managing floor control in accordance with another embodiment of the present invention. At step 302, a node receives a subscriber packet from an associated subscriber device. At step 304, on receiving the subscriber packet, the node creates a first node packet. The first node packet includes a first timestamp and the received subscriber packet. The first timestamp corresponds to the time the subscriber packet is received at the node. In an embodiment of the present invention, the timestamp is obtained from an absolute timing reference. As an example, the absolute timing reference may be a Global Positioning System (GPS). In an embodiment of the present invention, the first timestamp is determined on receiving the subscriber packet from the Radio Frequency (RF) signal demodulator of the node. On creating the first node packet, the node sends the first node packet to the other nodes in the network. At step 306, the node receives a subsequent node packet from the other node in the network 100. The subsequent node packet includes a subsequent timestamp and a subsequent subscriber packet. The subsequent timestamp corresponds to the time the subsequent subscriber packet is received at the other node.

At step 308, the node begins a ballot timer on creating the first node packet or on receiving the subsequent node packet. The ballot timer runs for a first predefined time interval. The floor holder is determined on the expiration the first predefined time interval.

In an embodiment of the present invention, the node creates a ballot list on the creation of the first node packet or on receiving the subsequent node packet. The ballot list includes a source address and the timestamp of the subscriber packets received from the associated subscriber devices or the node packets received from other nodes, subsequent to the commencement of the ballot timer. On creation of the ballot list, entries corresponding to the received node packets and the received subscriber packets are subsequently added to the ballot list till the expiration of the first predefined time interval.

At step 310, the node determines the floor holder on expiration of the first predefined time interval. Determination of the floor holder includes selecting the subscriber device corresponding to the oldest timestamp as the floor holder. In an embodiment of the present invention, the node determines the floor holder by selecting a subscriber device from the ballot list as a floor holder. In another embodiment of the present invention, the ballot list is deleted after the expiration of the first predefined time interval since the commencement of the ballot timer.

For example, in the network 100, the node 102 receives a subscriber packet from the subscriber device 110, the node 104 receives a subscriber packet from the subscriber device 112, and the node 106 receives a subscriber packet from the subscriber device 114. The subscriber packet received at the node 102 has a corresponding timestamp 't', provided by the time source 116. The subscriber packet received at the node 104 has a corresponding timestamp 't+x', provided by the time source 118. The subscriber packet received at the node 106 has a corresponding timestamp 't+x+y', provided by the time source 120. Each node then creates a first node packet based on the timestamp and the received subscriber packet. On creating the corresponding first node packets, each of the nodes sends their corresponding first node packets to the other nodes in the network.

Each node receives subsequent node packets from the other nodes in the network 100. The node 102 receives a subsequent node packet from the node 104 with a timestamp 't+x', and a subsequent node packet from the node 106 with a timestamp 't+x+y'. Similarly, the node 104, the node 106, and the node 108 also receive the subsequent node packets. Each node then begins a ballot timer on creation of the first node packet or on receiving the subsequent node packets. On the expiration of the first predefined time interval, the node 102 determines the subscriber device 110 as the floor holder, since the timestamp 't' corresponding to the subscriber device 110 is the earliest. Similarly, the node 104, the node 106, and the node 108 also determine the subscriber device 110 as the floor holder.

In an embodiment of the present invention, the node whose associated subscriber has been determined as the floor holder sends a signal to the other nodes in the network. The signal includes a winning timestamp of the floor holder. The winning timestamp is the oldest timestamp selected from the ballot list. In another embodiment of the invention, the signal includes the winning timestamp of the floor holder, a subscriber packet received from the floor holder, and a timestamp determined for the subscriber packet received from the floor holder. The timestamp corresponds to the time the subscriber packet is received at the node, and may be different from the winning timestamp.

In an embodiment of the present invention, the node receives at least one node packet whose source address matches the source address of the floor holder. The node then obtains the subscriber packet by removing the timestamp from at least one node packet. After obtaining the subscriber packet, the node sends the subscriber packet to one or more subscriber devices associated with the node. In an embodiment of the present invention, sending the subscriber packet includes transmitting the subscriber packet Over the Air (OTA) to one or more subscriber devices associated with the node.

In an embodiment of the present invention, the node whose associated subscriber device is selected as the floor holder sends a 'dekey signal' to those of the associated subscriber devices that are not selected as the floor holder. On receiving the dekey signal, associated subscriber devices stop sending subscriber packets. In another embodiment of the invention, the dekey signal is sent Over the Air (OTA) to the subscribers associated with the node.

The node, on determining the floor holder, starts a floor holder timer. The floor holder timer runs for a second predefined time interval. The second predefined time interval corresponds to the maximum time during which a packet from the floor holder is not received by the node. Once a packet is received from the floor holder and if the packet is received before expiration of the floor holder timer, the node resets the floor holder timer. In an embodiment of the present invention, the floor holder timer may be a countdown timer with a second predefined time interval. As such, the countdown timer is reset on receiving a packet from the floor holder, provided that the packet is received before expiration of the second predefined time interval. The floor control of the floor holder is terminated on receiving a message of the expiration of the second predefined time interval from the floor holder timer. In another embodiment, the floor control of the floor holder is terminated by receiving an 'end of call' message from the floor holder where the end of call message is sent by the floor holder to the associated node when the floor holder decides to leave the floor.

In an embodiment of the present invention, a new floor holder is determined when a new node packet is received at the node. The new floor holder is determined by comparing timestamps of packets. As such, the new node packet has an older winning timestamp than the winning timestamp of a current floor holder. Further, the winning timestamp of the new node packet is not older than the winning timestamp of the node packet received from a previous floor holder. The previous floor holder is the floor holder preceding the current floor holder. The subscriber device sending the new node packet is determined as the floor holder. In an embodiment of the present invention, the previous floor holder is the floor holder that immediately precedes the current floor holder and not any other preceding floor holder.

Figure 4:
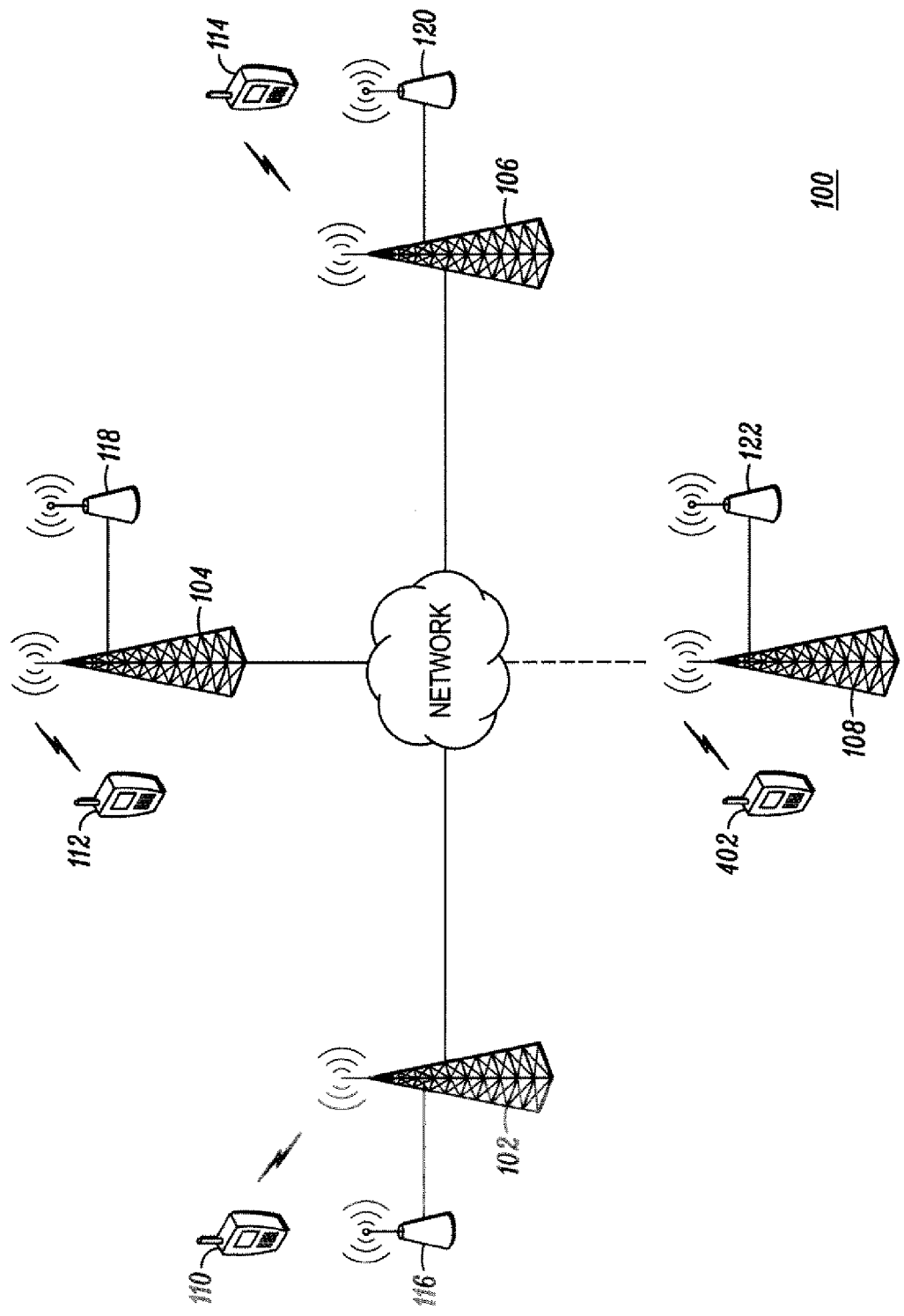
FIG. 4 illustrates an exemplary network in accordance with another embodiment of the present invention.

FIG. 4 illustrates the exemplary network 100 in accordance with another embodiment of the present invention. The network 100 is shown to further include a subscriber device 402, in addition to the elements illustrated in FIG. 1. The subscriber device 402 is associated with the node 108 and the node 108 may not be in communication with the network 100.

In an embodiment of the present invention, the node 108 receives a subscriber packet with a timestamp 't' from the subscriber device 402. Similarly, the node 102 receives a subscriber packet with a timestamp 't+x' from the subscriber device 110. The node 104 receives a subscriber packet with a timestamp 't+x+y' from the subscriber device 112. The node 106 receives a subscriber packet with a timestamp 't+x+y+z' from the subscriber device 114. Since the node 108 is not in communication with the network 100, the node 102, the node 104, and the node 106 receive no node packets from the node 108. Consequently, on the expiration of their first predefined time intervals, the node 102, the node 104, and the node 106 will determine the subscriber device 110 as the floor holder with the winning timestamp 't+x'. Similarly, on the expiration of the first predefined time interval at the node 108, the node 108 will determine the subscriber device 402 as the floor holder with the winning timestamp 't'.

At a later time, the node 108 may start communicating with the network 100. When a node packet from the node 108, having the winning timestamp 't', is received at the node 102, the node 102 selects the subscriber device 402 as the new floor holder. In another embodiment of the present invention, the node 102 selects the subscriber device 402 as the floor holder when the winning timestamp of the node packet received from the subscriber device 402 is not older than the winning timestamp of a packet received from a previous floor holder. In an embodiment of the present invention, the previous floor holder is the floor holder immediately preceding the current floor holder. Similarly, each of the node 102, the node 104, and the node 106, selects the subscriber device 402 as the new floor holder on receiving a node packet from the node 108 with a winning timestamp 't'.

Therefore, it should be clear from the preceding disclosure that managing floor control in accordance with an embodiment of the present invention does not involve dependence on centralized servers for managing floor control and is termed "decentralized." Moreover, an embodiment of the present invention is free from delays incurred in sending and receiving signals while determining the floor holder, since the nodes in the network negotiate and reach an agreement about a floor holder at any one time by sending signals to each other.

It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for managing floor control in a network, the network comprising a plurality of subscriber devices and a plurality of nodes, each subscriber device of the plurality of subscriber devices associated with at least one node, the method comprising at a node:

beginning a ballot timer when the earlier of a) a first node packet is created at the node, wherein the first node packet comprises a first timestamp and b) a second node packet is received at the node from a second node, wherein the second node packet comprises a second timestamp, wherein the ballot timer runs for a first predefined time interval, wherein the node is able to receive different node packets comprising different timestamps from other nodes during operation of the ballot timer; and determining a floor holder upon expiration of the first predefined time interval based upon an earliest time of the first timestamp and the different timestamps received from the other nodes, wherein a node packet having a timestamp prior to a winning timestamp of a previous floor holder but received by the node after determination of the floor holder is excluded from determination of a next floor holder, wherein the node and the second node have a same absolute timing reference, and wherein the ballot timer is begun and the floor holder determined at each of the plurality of nodes, the ballot timers at each of the plurality of nodes run concurrently to provide a decentralized method of managing floor control.

2. The method according to claim 1 wherein determining the floor holder further comprises generating a ballot list, wherein the ballot list comprises a source address and the timestamp of at least one of a) subscriber packets received from an associated subscriber device and b) the node packets received from other nodes subsequent to the commencement of the ballot timer.

3. The method according to claim 2 further comprising selecting a subscriber device corresponding to the oldest timestamp as the floor holder from the ballot list upon expiration of the ballot timer.

4. The method according to claim 2 further comprising deleting the ballot list upon expiration of the first predefined time interval.

5. The method according to claim 1 further comprising sending the first node packet to the other nodes in the network.

6. The method according to claim 1, wherein each of the plurality of nodes continues to forward subscriber packets received from an associated subscriber device to the other nodes until the ballot timer expires and then discontinues sending subscriber packets that are not sent by the floor holder.

7. The method according to claim 1 wherein the absolute timing reference is a Global Positioning System (GPS).

8. The method according to claim 1 further comprising transmitting a signal to the other nodes in the network, when an associated subscriber device is determined as the floor holder, wherein the signal comprises:

a winning timestamp of the associated subscriber device, wherein the winning timestamp is the earliest time of the first timestamp and the timestamps from other nodes;

the timestamp determined for at least one subscriber packet received from the associated subscriber device; and the subscriber packet received from the associated subscriber device.

9. A method for managing floor control in a network, the network comprising a plurality of subscriber devices and a plurality of nodes, each subscriber device of the plurality of subscriber devices associated with at least one node, the method comprising at a node:

receiving a subscriber packet from an associated subscriber device, wherein the subscriber packet comprises a digital sample and a source address;

creating a first node packet from the received subscriber packet, wherein the first node packet comprises the subscriber packet and a first timestamp that relates to a time that the subscriber packet is received by the node;

receiving a second node packet from another node, wherein the second node packet comprises a second subscriber packet and a second timestamp that relates to a time that the second subscriber packet is received by the other node;

beginning a ballot timer when the earlier of a) the first node packet is created and b) the second node packet is received, wherein the ballot timer runs for a first predefined time interval, wherein the node is able to receive different node packets comprising different timestamps from other nodes during operation of the ballot timer; and determining a floor holder upon expiration of the first predefined time interval based upon an earliest time of the first timestamp and the different timestamps received from the different nodes, wherein a node packet having a timestamp prior to a winning timestamp of a previous floor holder but received by the node after determination of the floor holder is excluded from determination of a next floor holder, wherein the node and the other node have a same absolute timing reference, wherein the floor control management does not depend on a centralized server, and wherein the ballot timer is begun and the floor holder determined at each of the plurality of nodes, the ballot timers at each of the plurality of nodes run concurrently to provide a decentralized method of managing floor control.

10. The method according to claim 9 further comprising at a node:

receiving at least one node packet whose source address matches the source address of the floor holder;

obtaining a subscriber packet by removing the timestamp from the at least one node packet; and sending the subscriber packet to one or more associated subscriber devices.

11. The method according to 9 further comprising each of the plurality of nodes continuing to forward subscriber packets received from an associated subscriber device to the other nodes until the ballot timer expires and then discontinuing sending subscriber packets that are not sent by the floor holder.

12. The method according to claim 9 further comprising at a node:
receiving a subscriber packet whose source address matches the source address of the floor holder; creating a node packet from the received subscriber packet; sending the node packet to the other nodes in the network; and not sending subscriber packets not received from the floor holder.

13. The method according to claim 9 further comprising transmitting a signal to the other nodes in the network, when an associated subscriber device is determined as the floor holder, wherein the signal comprises:
a winning timestamp of the associated subscriber device, wherein the winning timestamp is the earliest time of the first timestamp and the timestamps from other nodes;
the timestamp determined for at least one subscriber packet received from the associated subscriber device; and
the subscriber packet received from the associated subscriber device.

14. The method according to claim 9 further comprising starting a floor holder timer, wherein the floor holder timer runs for a second predefined time interval, wherein the second predefined time interval corresponds to a maximum time for which a packet from the floor holder is not received by the node.

15. The method according to claim 14 further comprising resetting the floor holder timer on receiving a packet from the floor holder, wherein the packet is received before the expiration of the second predefined time interval.

16. The method according to claim 14 wherein the previous floor holder is the floor holder immediately preceding a current floor holder.

17. The method according to claim 14 further comprising terminating the floor control of the floor holder on receiving at least one of:
a message of expiration of the second predefined time interval from the floor holder timer; and
an end of call message from the floor holder.

18. The method of claim 9 further comprising generating a ballot list, wherein the ballot list comprises a) the source address and the first timestamp of the subscriber packet and b) the source address and the second timestamps of the different node packets.

19. A method for managing floor control in a network, the network comprising a plurality of subscriber devices and a plurality of nodes, each subscriber device of the plurality of subscriber devices associated with at least one node, the method comprising at a node:
beginning a ballot timer when at least one of a) a first node packet is created at the node, wherein the first node packet comprises a first timestamp and b) a second node packet is received at the node from a second node, wherein the second node packet comprises a second timestamp, wherein the ballot timer runs for a first predefined time interval;
determining a floor holder upon expiration of the first predefined time interval based upon an earliest time of the first timestamp and the second timestamp; and transmitting a signal to the other nodes in the network, when an associated subscriber device is determined as the floor holder,
wherein the signal comprises: a winning timestamp of the associated subscriber device, wherein the winning timestamp is the earliest time of the first timestamp and the timestamps from other nodes;
the timestamp determined for at least one subscriber packet received from the associated subscriber device; and
the subscriber packet received from the associated subscriber device, wherein a node packet having a timestamp prior to a winning timestamp of a previous floor holder but received by the node after determination of the floor holder is excluded from determination of a next floor holder,
wherein the node and the second node have a same absolute timing reference, and wherein the ballot timer is begun and the floor holder determined at each of the plurality of nodes, the ballot timers at each of the plurality of nodes run concurrently to provide a decentralized method of managing floor control.

20. The method according to claim 19 wherein the absolute timing reference is a Global Positioning System (GPS).

21. A method for managing floor control in a network, the network comprising a plurality of subscriber devices and a plurality of nodes, each subscriber device of the plurality of subscriber devices associated with at least one node, the method comprising at a node:
beginning a ballot timer when the earlier of a) a first node packet is created at the node, wherein the first node packet comprises a first timestamp and b) a second node packet is received at the node from a second node, wherein the second node packet comprises a second timestamp, wherein the ballot timer runs for a first predefined time interval, wherein the node is able to receive different node packets comprising different timestamps from other nodes during operation of the ballot timer;
determining a first floor holder upon expiration of the first predefined time interval based upon an earliest time of the first timestamp and the different timestamps received from the different nodes;
repeating operation of the ballot timer and determination of the floor holder for second and third floor holders after the first and second floor holder, respectively, no longer holds the floor; and
excluding from determination of the third floor holder a node packet having a timestamp prior to a winning timestamp of the first floor holder but received by the node after determination of the second floor holder,
wherein the node and the other nodes have the same absolute timing reference, wherein the ballot timer is begun and each floor holder determined at each of the plurality of nodes, the ballot timers at each of the plurality of nodes running concurrently to provide a decentralized method of managing floor control.

22. The method according to claim 21 wherein the first, second, and third floor holders are adjacent floor holders.

23. The method according to claim 21 further comprising predetermining the third floor holder when a new node packet having a timestamp prior to a winning timestamp of the third floor holder is received by the node after determination of the third floor holder.

* * * * *

UNITED STATES PATENT AND TRADEMARK OFFICE
CERTIFICATE OF CORRECTION

PATENT NO. : 7,814,205 B2  Page 1 of 1
APPLICATION NO. : 11/300779
DATED : October 12, 2010
INVENTOR(S) : LoGalbo et al.

It is certified that error appears in the above-identified patent and that said Letters Patent is hereby corrected as shown below:

1. On the Title Page, in Item (56), under "U.S. PATENT DOCUMENTS", in Column 1, Line 4, after "Bridge et al." insert -- 1/1 --.

2. In Column 1, Line 43, delete "severs" and insert -- servers --, therefor.

Signed and Sealed this
Twenty-second Day of November, 2011

David J. Kappos
*Director of the United States Patent and Trademark Office*